United States Patent [19]

Determann et al.

[11] 4,127,318
[45] Nov. 28, 1978

[54] DIRECT ILLUMINATION APPARATUS FOR LIGHT AND DARK FIELD ILLUMINATION

[75] Inventors: Hans Determann, Nauborn; Günter Reinheimer, Biebertal; Hans W. Stankewitz, Steindorf, all of Germany

[73] Assignee: Ernst Leitz Wetzlar GmbH, Wetzlar, Fed. Rep. of Germany

[21] Appl. No.: 724,854

[22] Filed: Sep. 20, 1976

[30] Foreign Application Priority Data

Sep. 20, 1975 [DE] Fed. Rep. of Germany ....... 2542075

[51] Int. Cl.² ............................................. G02B 21/14
[52] U.S. Cl. ...................................... 350/91; 350/12; 350/89
[58] Field of Search ....................... 350/91, 90, 89, 12, 350/13, 235, 236, 237, 189, 191, 194, 197, 314, 315, 266, 39, 87; 240/2 MA

[56] References Cited

U.S. PATENT DOCUMENTS

| 1,157,257 | 10/1915 | Siedentopf | 350/89 |
| 1,935,444 | 11/1933 | Heine | 350/91 |
| 1,943,510 | 1/1934 | Bauersfeld et al. | 350/91 |
| 1,985,074 | 12/1934 | Bauersfeld | 350/87 |
| 1,996,920 | 4/1935 | Hauser | 350/236 |
| 2,809,554 | 10/1957 | Bernhardt | 350/191 |
| 3,930,713 | 1/1976 | Stankewitz et al. | 350/91 |

FOREIGN PATENT DOCUMENTS

| 973,489 | 3/1960 | Fed. Rep. of Germany | 350/236 |
| 1,123,134 | 2/1962 | Fed. Rep. of Germany | 350/12 |

*Primary Examiner*—Jon W. Henry
*Attorney, Agent, or Firm*—Gilbert L. Wells

[57] ABSTRACT

Direct illumination apparatus for microscopes for generating illumination of light fields, phase contrasts, interference contrast and dark fields. A deflecting mirror is located in the observation beam, which is partly specular at its center region and fully specular in an annular zone, and an annular condensor is associated with the illumination system. The apparatus is provided with an adjustable stop or diaphragm for the purpose of suppressing the light field beam and with optical components for illuminating an objective pupil for the light field and the annular condensor with collimated light for the dark field. An aperture stop is located in the path of the light field beam nearly or approximately limiting the illumination of the object field in the path of the dark field beam. An annular lens (17) is mounted centrally to the optical axis (15) in the at least approximately collimated dark field beam, this annular lens imaging the diaphragm or aperture stop plane (7) in a plane (18) located near the threaded portion (3') of microscope objective (3).

17 Claims, 6 Drawing Figures

DIRECT ILLUMINATION APPARATUS FOR LIGHT AND DARK FIELD ILLUMINATION

CROSS REFERENCE TO A RELATED APPLICATION

Applicants claim priority under 35 U.S.C. 119 for Application P 25 42 075.1, filed Sept. 20, 1975 in the Patent Office of the Federal Republic of Germany.

BACKGROUND OF THE INVENTION

The present invention relates to a direct illumination apparatus for microscopes for generating illumination for light fields, phase contrasts, interference contrasts and dark fields by means of a deflecting mirror mounted in the path of the observation beam and partly silvered at the center and fully silvered in an annulus, and to an annular condensor associated with the illumination system with an adjustable stop to suppress the light field beam and with optical components for illuminating an objective pupil for the light field and the annular condensor with collimated light for the dark field, a stop acting as a diaphragm in the path of the light field beam and approximately limiting the illumination of the object field in the path of the dark field beam.

The state of the art of incident light illumination instruments for selective light and dark field illumination may be ascertained by reference to U.S. Pat. Nos. 1,943,510 and 3,930,713, and West German Patent Application 2,021,784 of K. P. Schindl, published Nov. 11, 1970, the disclosures of which are incorporated herein.

The novel illuminating apparatus of the present invention is especially suited as an accessory to mass produced microscopes, even to those of simple and compact design.

Direct illumination apparatus of the present invention are disclosed in West German Published Application No. 2,021,784 and U.S. Pat. No. 1,943,510, in which a separate outer dark field beam of annular cross section and an inner light field beam of circular cross section are generated. The illumination beams are deflected into the observation path of the microscope by means of a mirror at 45° to the optical axis of the illumination apparatus. The mirror is fully specular in the region of the incident dark field beam and partly transmitting in that of the light field beam. Because the dark field beam is guided around the light field beam even after it is guided into the observation beam, the cross section of the dark field beam is fairly large.

Mass produced microscopes, especially of small and simple design, are provided with a standardized borehole in the stage which allows passage of the observation beam. The cross section of this borehole is appreciably smaller than the above said cross section of the dark field beam. Therefore the prior art apparatus are unsuited as accessories for these microscopes.

On the other hand, U.S. Pat. No. 3,930,713 discloses a direct illumination instrument in which an annular mirror with reflecting inner surface is mounted after the deflecting mirror to focus the dark field beam within the borehole in the microscope stage. An annular lens mounted in the objective and associated with the illumination instrument guides the dark field beam again around the observation beam. But this instrument assumes that there will be imaging of the aperture stop plane by the dark field beam onto the partly transmitting region of the deflecting mirror. This inevitably causes losses of light and stray light in the dark field beam.

SUMMARY OF THE INVENTION

Having in mind the limitations of the prior art, it is an object of the present invention to provide a direct illumination apparatus in which the dark field beam is made to pass through a relatively narrow borehole in the microscope stage so as to ensure full use of the light in the dark field beam and being simple in manufacture.

This object is achieved for a direct illumination apparatus for microscopes for generating illumination of light fields, phase contrasts, interference contrast and dark fields. A deflecting mirror is located in the observation beam, which is partly specular at its center region and fully specular in an annular zone, and an annular condensor is associated with the illumination system. The apparatus is provided with an adjustable stop or diaphragm for the purpose of suppressing the light field beam and with optical components for illuminating an objective pupil for the light field and the annular condensor with colluminated light for the dark field. An aperture stop is located in the path of the light field beam nearly limiting the illumination of the object field in the path of the dark field beam.

The present invention differs particularly from the prior art in that an annular lens 17 is mounted centrally to the optical axis 15 in the at least approximately collimated dark field beam, this annular lens imaging the diaphragm or aperture stop plane 7 in a plane 18 located near the threaded portion 3' of microscope objective 3.

In the particular embodiments of the present invention the annular lens 17 has at least one spherical surface, one spherical and one plane surface, at least one toric surface, at least one aspherical surface, at least one conical surface, or the light entry surface is spherical and the light exit surface is toric.

In another embodiment of the present invention, the refractivity of annular lens 17 is selected so that acting in concert with those parts of the optical system 9, 10 which affect the path of the dark field beam stop 12 is imaged on the borehole of the annular condensor 19 on the side of light entry.

In yet another embodiment, the refractivity of annular lens 17 is selected so that the diaphragm or stop 11' limiting the aperture of the dark field beam is imaged in the vicinity of the screw-on thread portion 3' of objective 3.

In still another embodiment, the proportion of the partially specular zone 14 of the deflecting mirror is selected so that at least approximately equal brightnesses results in the dark and light field beams.

Another embodiment couples a neutral density filter with stop 12 so that when the stop 12 is removed, the neutral density filter is inserted into the path of the light field, and vice versa.

Yet another embodiment uses as identical components annular lens 17 and annular lens 19 of the annular condensor.

BRIEF DESCRIPTION OF THE DRAWING

The various embodiments of the present invention may best be described by reference to the appended drawings, wherein.

DESCRIPTION OF THE PREFERRED EMBODIMENTS

Figure 1:
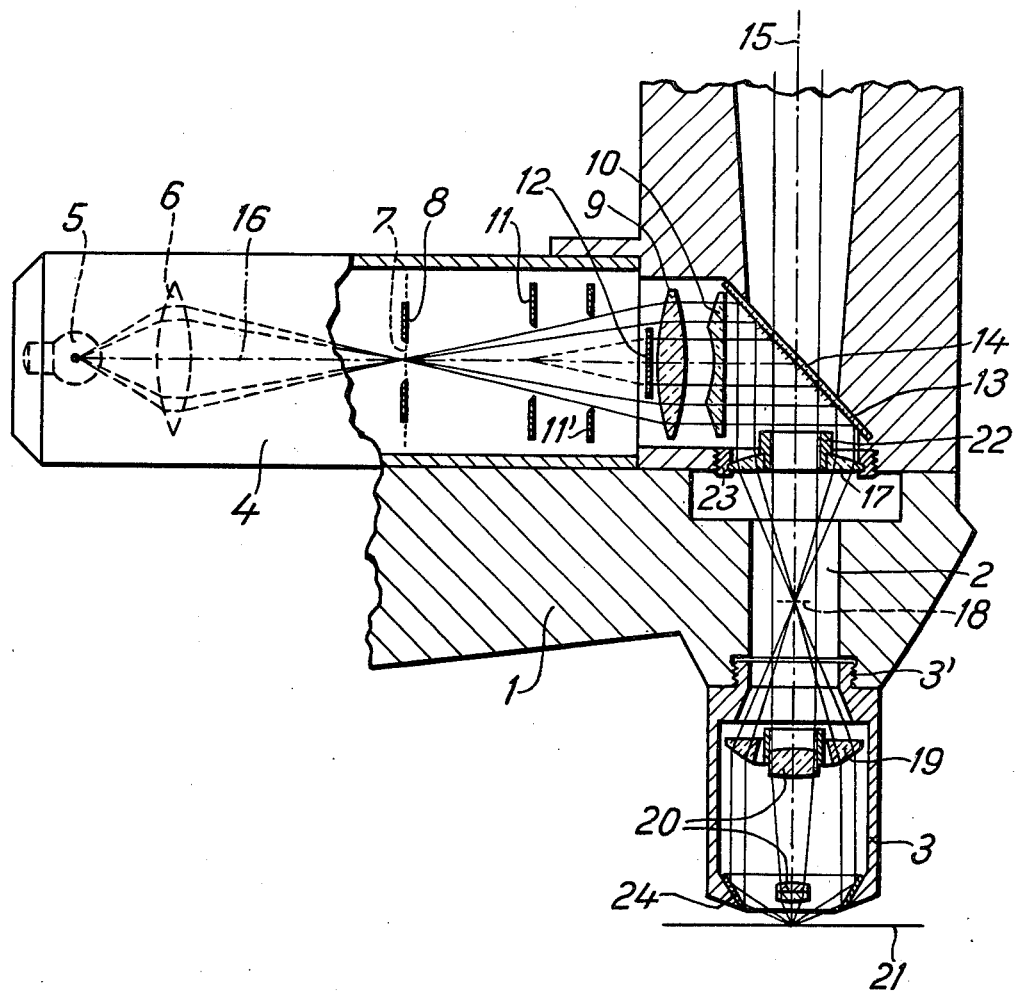
FIG. 1 illustrates in schematic form an embodiment of the present invention.
Figure 2A:
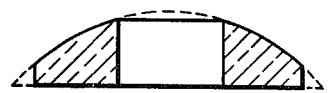
FIG. 2a illustrates in cross section an embodiment of the annular lens of FIG. 1 having one spherical surface and one plane surface.
Figure 2B:
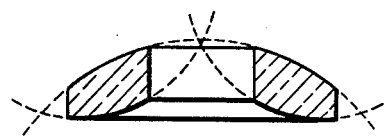
FIG. 2b illustrates in cross section an embodiment of the annular lens of FIG. 1 having one spherical surface and one toric surface.
Figure 2C:
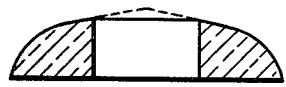
FIG. 2c illustrates in cross section an embodiment of the annular lens of FIG. 1 having one aspherical surface and one plane surface.
Figure 2D:
FIG. 2d illustrates in cross section an embodiment of the annular lens of FIG. 1 having one conical surface and one plane surface.

With particular reference to FIG. 1, frame 1 of the microscope is provided with a borehole 2 admitting the observation and illumination beams. An objective 3 is held in the borehole by means of a threaded portion. Obviously an objective turret may also be provided.

Figure 3:
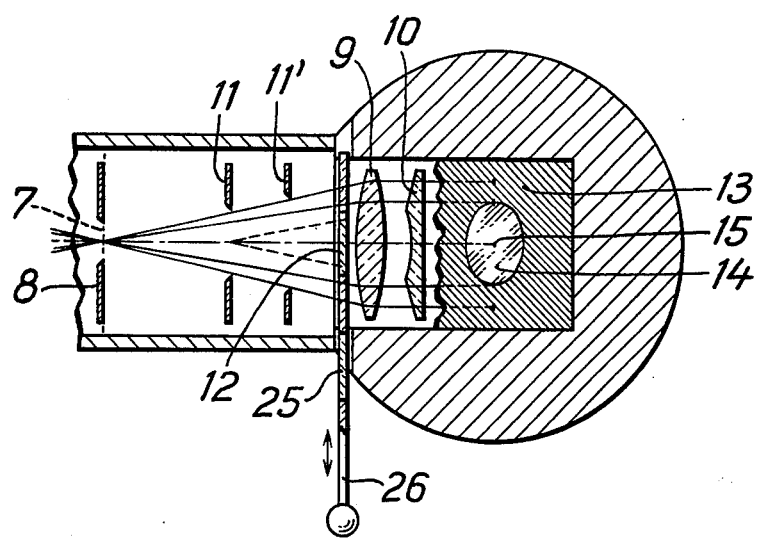
FIG. 3 is a plan or top view, partly in cross section, of a detailed showing of an embodiment of FIG. 1 having an aperture changer or slide for exchanging the positioned stop with a neutral density filter.

Illumination apparatus 4 rests on frame 1 and comprises a light source 5 which is imaged by lens 6 into aperture plane 7. The aperture plane is bounded by an adjustable diaphragm 8. Further lenses 9, 10 are given a refractivity so that they image on infinity an illumination field stop 11 in an inner zone and aperture stop 8 in an outer zone. A positioned stop 12 allows blocking the inside beam used for light field illumination. When stop 12 is out of position, another adjustable illumination diaphragm 11 allows blocking the beam used for dark field illumination. Furthermore, a fixed stop 11' is provided to limit the aperture of the dark field beam. The latter is deflected by means of a fully specular mirror 13 in the direction of the optical axis 15 of the observation beam, and the light field beam by means of a partly transmitting mirror 14. Mirror surfaces 13 and 14 are mounted on a common substrate subtending an angle of 45° with the optical axis 16 of the illumination beam. Approximately the proportion of the partly transmitting region 14 is such that at least approximately equal brightnesses are obtained in the dark and light fields, so that when switching from dark to light field illumination, there are no changes in brightness objectionable to the eye. The same purpose is also achieved if, as shown in FIG. 3, when passing from dark to light field illumination by removing stop 12, there is a simultaneous coupled introduction of a suitable neutral density filter 25. Stop 12 and this filter 25, for instance, may be mounted on a slider 26 or changing device. The neutral density filter however may also be introduced through a suitable changing device into the illumination beam in the plane conjugate to the objective pupil. This entails the advantage that the optical components for generating interference contrast and phase contrast, such as a Wollaston prism and phase rings may also be mounted on the same changing device.

According to the present invention, an annular lens 17 mounted after the deflecting mirror focuses the aperture plane 7 by means of the dark field beam in a plane 18 located before objective 3 within borehole 2 in the stage. An annular lens 19 associated with the illumination system and mounted in objective 3 focuses on the aperture stop image in plane 18 and guides it around the imaging system 20 of objective 3 and toward object plane 21.

The imaging role or annular lenses 17, 19 allows narrowing the cross section of the dark field beam in the region of borehole 2 to such an extent that it passes without loss of light through this borehole 2. Geometric separation between dark field and light field beams is feasible if a cylindrical annular stop 22 is inserted in annular lens 17. This annular stop is of such design as to cover the inside rim of the light admission surface of annular lens 17. Reflections within annular lens 17 at its inside cylindrical boundaries are thus avoided.

Internal reflections also occur when the rims of the annular lens are bevelled. In such a case it is advantageous to cover these regions with suitable annular stops. This is implemented for instance by a suitable design of the outer mounting 23 of annular lens 17.

The geometric separation between dark and light field beams is achieved when the spacing between stop 12 and lenses 9, 10 and the refractivity of lenses 9, 10 where they affect the path of the dark field beam are selected so that a shadow image of stop 12 is produced by annular lens 17, which sharply overlaps the bore of condensor annular lens 19. In addition, the fixed stop 11' is of such a design that no light from the dark field beam falls on the inside wall at the objective screw-on thread 3', that is, stop 11' is imaged in the vicinity of the screw-on thread.

In order to admit as much light as possible through the small annular zone of annular lens 17, this zone being small by inherent design, the annular lens has a collecting effect and, as shown in FIGS. 2a–2d, spherical, aspherical, toric, conical or plane shapes being accordingly selected for the optically refracting surfaces. It is especially advantageous with respect to the guidance of the light beams to design the optical exit surfaces toric with collecting effects.

It is immediately obvious that the same considerations applying to the design of annular lens 17 also are valid for annular lens 19 associated with the illumination system and mounted in objective 3. It is particularly advantageous with respect to economy and production that the beam guidance disclosed in the present invention allows simultaneous fabrication of both annular lenses 17 and 19.

When there is a light collecting effect for spherical entrance surfaces and toric exit surfaces of the two annular lenses, then annular lens 19 associated with the illumination apparatus and mounted in objective 3 guides the dark field beam in slightly divergent manner, slightly moving away from the optical axis 15, onto objective annular mirror 24, from which it illuminates object plane 21.

We claim:

1. In a direct illumination apparatus for microscopes having a microscope objective (3) with a threaded portion (3') and a light source (5) for generating light field, phase contrast, interference contrast and dark field illumination along an optical axis comprising:
   (a) deflecting mirror means located along said optical axis and having a center region which is partly specular and an annular zone which is fully specular;
   (b) an annular condensor (19) located along said optical axis and within said objective (3);
   (c) an adjustable diaphragm (8) located at an aperture stop plane along said optical axis between said light source and said deflecting mirror, means (12) for suppressing a light field beam;

(d) optical components, (9, 10) located along said optical axis between said adjustable diaphragm and said deflecting mirror means for projecting collimated light onto said deflecting mirror means for both bright and dark field illumination, thereby illuminating an objective plane for a light field and said annular condensor with light for a dark field; and (e) an aperture stop (11) located along said optical axis between said adjustable diaphragm and said optical components in the path of said dark field beam; the improvement comprising:

(f) an annular lens (17) mounted along said optical axis and concentrically therewith between said deflecting mirror means and said condensor in the dark field beam after deflection by said fully specular annular zone, said annular lens (17) having a refractivity for imaging said aperture stop plane within the cross section of the bright field beam in a plane (18) located near said threaded portion and in front thereof in the direction of light travel.

2. A direct illumination apparatus as defined in claim 1, wherein said annular condensor (19) has a borehole and a positioned stop (12) is located in front of said optical components (9, 10) and said deflecting mirror means and said annular lens (17) has a selected refractivity such that in concert with said optical components (9, 10) for affecting the dark field beam said positioned stop (12) is imaged on said borehole of said annular condensor (19) on the side of light entry.

3. A direct illumination apparatus as defined in claim 1, wherein said annular lens (17) comprises at least one spherical surface.

4. A direct illumination apparatus as defined in claim 1, wherein said annular lens (17) comprises one spherical and one plane surface.

5. A direct illumination apparatus as defined in claim 1, wherein said annular lens (17) comprises at least one toric surface.

6. A direct illumination apparatus as defined in claim 1, wherein said annular lens (17) comprises at least one aspherical surface.

7. A direct illumination apparatus as defined in claim 1, wherein said lens (17) comprises at least one conical surface.

8. A direct illumination apparatus as defined in claim 1, wherein said annular lens (17) has a spherical light entry surface and a toric light exit surface.

9. A direct illumination apparatus as defined in claim 1, wherein a stop (22) comprising a hollow cylinder and separating the dark field and the light field beams is inserted in the aperture of said annular lens (17).

10. A direct illumination apparatus as defined in claim 1, wherein annular stops are mounted on the inside and outside rims of the light entry surface of said annular lens (17).

11. A direct illumination apparatus as defined in claim 10, wherein a stop (22) comprising a hollow cylinder and separating the dark field and light field beams is inserted in the aperture of said annular lens (17).

12. A direct illumination apparatus as defined in claim 1, wherein annular stops are mounted at the inside and outside rims of the light exit surface of said annular lens (17).

13. A direct illumination apparatus as defined in claim 1, wherein a frame (23) defines at least one outside annular stop of said annular lens (17).

14. A direct illumination apparatus as defined in claim 2, wherein said annular lens (17) has a selected refractivity such that a fixed stop (11') which limits the aperture of the dark field beam is imaged in the vicinity of said threaded portion (3').

15. A direct illumination apparatus as defined in claim 1, wherein the area of the partially specular center region (14) of said deflecting mirror means is proportional to said fully specular region so that at least approximately equal brightness results in the dark and light field images.

16. A direct illumination apparatus as defined in claim 2, wherein a neutral density filter (25) has means (26) for coupling with said positioned stop (12) for inserting said neutral density filter in the path of the bright field when said positioned stop (12) is removed and vice versa.

17. A direct illumination apparatus as defined in claim 1, wherein said annular lens (17) and an annular lens (19) of said annular condensor are identical components.

* * * * *